US009613384B2

(12) United States Patent
Eom et al.

(10) Patent No.: US 9,613,384 B2
(45) Date of Patent: Apr. 4, 2017

(54) PERSONAL LEARNING APPARATUS AND METHOD BASED ON WIRELESS COMMUNICATION NETWORK

(75) Inventors: Myung-Jin Eom, Seoul (KR); Myoung-Jong Song, Hwaseong-si (KR); Ik-Soo Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 359 days.

(21) Appl. No.: 12/916,987

(22) Filed: Nov. 1, 2010

(65) Prior Publication Data

US 2011/0104654 A1 May 5, 2011

(30) Foreign Application Priority Data

Oct. 30, 2009 (KR) .................. 10-2009-0104537

(51) Int. Cl.
G09B 3/00 (2006.01)
G06Q 50/20 (2012.01)
G06Q 10/10 (2012.01)

(52) U.S. Cl.
CPC ............. G06Q 50/20 (2013.01); G06Q 10/10 (2013.01)

(58) Field of Classification Search
USPC .................................................. 434/317, 351
See application file for complete search history.

(56) References Cited

U.S. PATENT DOCUMENTS

| | | | | |
|---|---|---|---|---|
| 6,678,499 B1 * | 1/2004 | Silverbrook et al. | ......... | 434/350 |
| 6,760,748 B1 * | 7/2004 | Hakim | .......................... | 709/204 |
| 2007/0026371 A1 * | 2/2007 | Wood | ............................. | 434/317 |
| 2007/0223439 A1 | 9/2007 | Kosai | | |
| 2008/0227076 A1 | 9/2008 | Johnson | | |
| 2008/0254438 A1 | 10/2008 | Woolf et al. | | |
| 2009/0035733 A1 | 2/2009 | Meitar et al. | | |
| 2010/0112540 A1 * | 5/2010 | Gross et al. | .................. | 434/351 |

FOREIGN PATENT DOCUMENTS

| | | | |
|---|---|---|---|
| JP | 2002149845 | A | 5/2002 |
| JP | 2002230183 | A | 8/2002 |
| JP | 200453766 | A | 2/2004 |
| JP | 2005-157973 | A | 6/2005 |
| JP | 2007-266697 | A | 10/2007 |
| KR | 10-2002-0088647 | A | 11/2002 |
| KR | 10-2005-0078335 | A | 8/2005 |

(Continued)

OTHER PUBLICATIONS

International Search Report dated Aug. 11, 2011 issued by the International Searching Authority in counterpart International application No. PCT/KR2010/007623.

(Continued)

*Primary Examiner* — Kesha Frisby
(74) *Attorney, Agent, or Firm* — Sughrue Mion, PLLC

(57) ABSTRACT

A personal learning apparatus and method using a terminal which supports an electronic book function in a wireless communication network are provided. The personal learning method includes: distributing, by a master device, learning data to the terminal within a wireless communication service area; collecting, by the master device, learning results based on the learning data from the terminal provided with the learning data; and storing, by the master device, the collected learning results.

24 Claims, 9 Drawing Sheets

(56) References Cited

FOREIGN PATENT DOCUMENTS

| KR | 10-2006-0103043 A | 9/2006 |
|----|-------------------|--------|
| KR | 10-2006-0116647 A | 11/2006 |
| KR | 10-2007-0112441 A | 11/2007 |
| TW | 200743064 A | 11/2007 |
| TW | 200917173 A | 4/2009 |
| WO | 2006109342 A1 | 10/2006 |

OTHER PUBLICATIONS

Communication dated Dec. 20, 2013, issued by the Taiwanese Patent Office in counterpart Taiwanese Application No. 099137483.
Communication dated Jan. 24, 2014, issued by the State Intellectual Property Office of the People's Republic of China in counterpart Chinese Application No. 201010535786.9.
Triantafillou E et al., "The design and evaluation of a computerized adaptive test on mobile devices", Computers and Education, May 1, 2008; pp. 1319-1330; Greece; XP022593396.
Davis S M; "Research to industry: Four years of observations in classrooms using a network of handheld devices"; Computer Society; Proceedings of the IEEE International Workshop on Wireless and Mobile Technologies in Education; Aug. 29, 2002; 8 pages total; United States; XP010606179.
Marco SA et al; "Handheld devices for cooperative educational activities"; Proceedings of the 2006 ACM Symposium on Applied Computing, SAC '06, Apr. 23, 2006; 5 pages total; Portugal; XP55143474.
Communication dated Oct. 8, 2014 issued by European Patent Office in counterpart European application No. 10827164.4.
Communication dated Sep. 26, 2014 issued by Australian Intellectual Property Office in counterpart Australian application No. 2010313943.
Communication dated Aug. 12, 2014 issued by Japanese Patent Office in counterpart Japanese application No. 2010244483.
Communication dated Jan. 13, 2015, issued by the Australian Intellectual Property Office in counterpart Australian Application No. 2010313943.
Communication dated Jan. 16, 2015, issued by the Canadian Intellectual Property Office in counterpart Canadian Application No. 2779443.
SMART Technologies Inc., "SynchronEyes 7 Classroom Management Software", Aug. 11, 2007, 90 pages total.
Communication dated Mar. 17, 2015 issued by the Australian Government in counterpart Australian Patent Application No. 2010313943.
SMART Technologies Inc, "SMART Technologies website", Aug. 11, 2007; 1 page.
SMART Technologies Inc, "SMART Technologies website > Products > SynchronEyes", Jul. 2, 2007; 2 pages.
Krishnamurthy, B. et al., "Key Differences between HTTP/1.0 and HTTP/1.1", Aug. 17, 2000; 25 pages.
Dierks, et al., "The Transport Layer Security (TLS) Protocol Version 1.2", Network Working Group, Aug. 2008, 104 pages total, https://tools.ietf.org/html/rfc5246.
Communication dated Nov. 28, 2016, issued by the Australian Patent Office in counterpart Australian Patent Application No. 2015202739.

* cited by examiner ated PATENT APPLICATION

PERSONAL LEARNING APPARATUS AND METHOD BASED ON WIRELESS COMMUNICATION NETWORK

CROSS-REFERENCE TO RELATED PATENT APPLICATION

This application claims priority from Korean Patent Application No. 10-2009-0104537, filed Oct. 30, 2009 in the Korean Intellectual Property Office, the contents of which are hereby incorporated by reference in their entirety.

BACKGROUND

1. Field

Apparatuses and methods consistent with exemplary embodiments relate to a personal learning apparatus and method based on a wireless communication network, and more particularly to a personal learning apparatus and method which allow personal learning to be executed, using a terminal which supports an electronic book function in a wireless communication network.

2. Description of the Related Art

In general, education occurs off-line. However, the development of communication technologies has made education contents available on-line.

Representative on-line education contents are classified into education contents based on a television, and education contents based on a communication network, such as the Internet. In particular, the education contents based on a communication network support a system which stores education data so as to be capable of being co-owned by a large number of people, and allows only approved users to download and use desired education data.

In general, the education contents based on a communication network provide education on the basis of a server and education computers wherein the server and the education computers are interconnected with each other through a network. In such a case, the server distributes education data to the education computers, so that an educator and a learner could own the same education data jointly.

When an examination is given using the above-mentioned education data, an education computer is assigned to each person taking the examination, and the server distributes examination questions to the education computers for taking the examination. Accordingly, each person solves the questions distributed through the education computers, each of which is assigned to a corresponding person, and transmits answers corresponding to the questions to the server.

With the above-mentioned system, there are restrictions in terms of individually confirming results and reasons for wrongly answered questions by a person who took the examination. Furthermore, the above-mentioned system is restrictive in terms of space for installing the education computers.

Due to the above-mentioned problems, there is a need for education contents that can improve the use of education results while minimizing the restrictions in terms of space.

SUMMARY

Exemplary embodiments provide an apparatus and a method execute a personal learning service using a user terminal which exists within a service area and supports an electronic book function, on the basis of a wireless communication network.

Also, exemplary embodiments provide an apparatus and a method for collecting and managing learning results obtained according to a personal learning service from a user terminal which exists within a service area and supports an electronic book function, on the basis of a wireless communication network.

Also, exemplary embodiments provide an apparatus and a method for analyzing learning results collected from a user terminal which exists within a service area and supports an electronic book function, and for transmitting the analyzed learning results to the user terminal, on the basis of a wireless communication network.

Also, exemplary embodiments provide an apparatus and a method to execute an examination using an authenticated user terminal capable of being wirelessly communicated with a master device, and to confirm a result of the examination through the authenticated user terminal.

Also, exemplary embodiments provide an apparatus and a method to allow only persons having a predetermined right to access learning and teaching information among the functions for a personal learning service in a user terminal which supports an electronic book function.

According to an aspect of an exemplary embodiment, there is provided a personal learning method using a terminal which supports a wireless communication operation, and an electronic book operation, the method including: distributing, by a master device, learning data to the terminal within a wireless communication service area; collecting, by the master device, learning results based on the learning data from the terminal provided with the learning data; and storing, by the master device, the collected learning results.

According to an aspect of another exemplary embodiment, there is provided a personal learning method in a terminal which supports a wireless communication operation, and an electronic book operation, the method including: receiving, by the terminal, learning data distributed from a master device; and transmitting learning results based on the received learning data to the master device.

According to an aspect of another exemplary embodiment, there is provided a master device for providing a personal learning service to a terminal which supports a wireless communication operation and an electronic book operation, the master device including: a terminal authentication unit which performs an authentication of the terminal within a wireless communication service area; a learning data producing unit which provides learning data; a communication unit which distributes the learning data to the terminal authenticated by the authentication unit, and which receives learning results based on the learning data from the terminal provided with the learning data; a learning results collection unit which collects the learning results based on the learning data from the terminal provided with the learning data; and a storage medium which stores the collected learning results.

According to an aspect of another exemplary embodiment, there is provided a terminal for supporting personal learning using a wireless communication operation and an electronic book operation, the terminal including: a communication unit which executes an authentication of the terminal by a master device when the terminal enters into a wireless communication service area of the master device, and which receives learning data distributed from the master device; a learning unit which executes a personal learning service based on the received learning data; a learning result producing unit which transmits learning results to the master device through the communication unit, the learning results being produced from the personal learning service executed by the learning unit; and a recording medium which stores the received learning data and the produced learning results.

According to an aspect of another exemplary embodiment, there is provided a personal learning method in a terminal which supports a wireless communication operation and an electronic book operation, the personal learning method including: storing learning data and learning guide data, and executing a personal learning service using the stored learning data when a learning request is received from a learner, the learning guide data being protected by a digital right management operation; analyzing learning results acquired from the personal learning service using the stored learning guide data if the personal learning service is completed; and storing the analyzed results or outputting the analyzed results using a user interface.

According to an aspect of another exemplary embodiment, there is provided a personal learning method using a terminal that supports a wireless communication operation and an electronic book operation, the personal learning method including: distributing, by a master device, learning data to the terminal within a wireless communication service area; collecting, by the master device, learning results based on the learning data from the terminal provided with the learning data; and providing, by the master device, an analysis of the collected learning results to the terminal.

BRIEF DESCRIPTION OF THE DRAWINGS

The above and/or other aspects will be more apparent from the following detailed description of exemplary embodiments taken in conjunction with the accompanying drawings, in which.

DETAILED DESCRIPTION OF EXEMPLARY EMBODIMENTS

Figure 1:
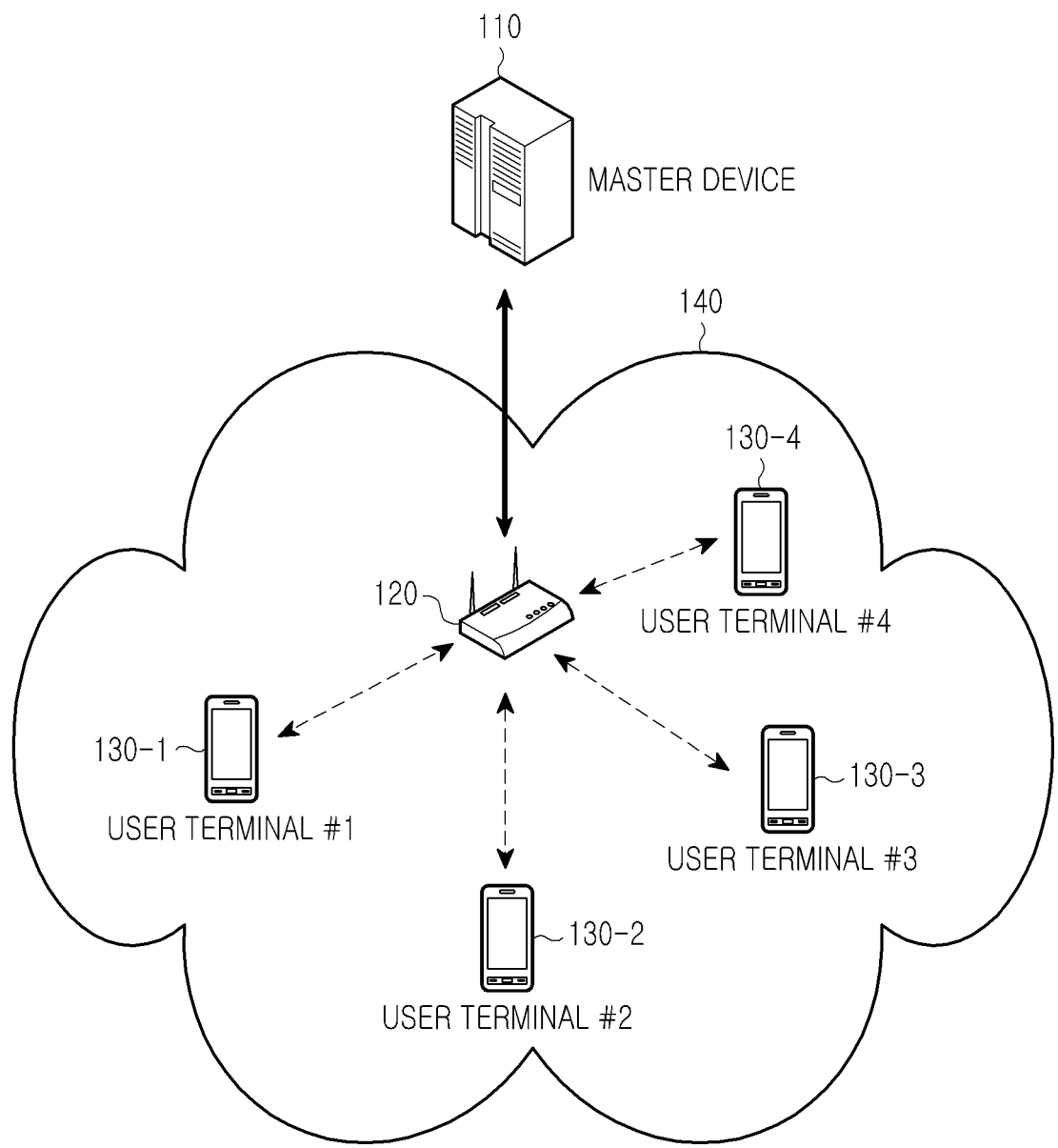
FIG. 1 shows an example of a case in which a wireless communication network for supporting a learning method includes separate equipment for a wireless communication service, according to an exemplary embodiment.

Hereinafter, exemplary embodiments will be described with reference to the accompanying drawings. In the following description, a detailed description of known functions and configurations incorporated herein will be omitted when it may make the subject matter of the exemplary embodiments rather unclear. Further, various specific definitions found in the following description are provided only to help a general understanding of the exemplary embodiments, and it is apparent to those skilled in the art that the exemplary embodiments can be implemented without such definitions. Expressions such as "at least one of," when preceding a list of elements, modify the entire list of elements and do not modify the individual elements of the list.

Electronic books, which are an alternative to printed books, have been developed on the basis of developments of communication networks, such as the Internet, and digital technologies. An electronic book refers to a new concept book which stores, in a user terminal, a text prepared as an electronic document in lieu of an existing paper book so that the electronic book can be read irrespective of time and place.

Such an electronic book may be considered as a kind of printed matter which processes and stores contents of a book in a digital format, and is referred to with various names, such as E-book, E-text, online book and file book.

The portability and convenience of the electronic book allows a user to have a plurality of books through a compact user terminal without carrying large and heavy books. Such an electronic book has various advantages in terms of simplification of the distribution process, reduction of stock burden, capability of outputting various contents, and efficiency in storage management, as compared to an existing printed book.

In addition, such an electronic book has an advantage in that upon interworking with multimedia contents, the electronic book can include more diversified information than an existing text-based paper book. Therefore, in order to further advance the use of electronic books, a convergence technique is required which allows multimedia contents and text-based electronic book contents to interwork with each other.

In the following description of exemplary embodiments, by way of an example, discussion will be made for wireless communication networks for providing personal learning services, such as an examination, to a user terminal which supports an electronic book function. In addition, a detailed description will be made for exemplary constructions of a master device and a user terminal for providing a personal learning service on the basis of the above-mentioned wireless communication networks, and exemplary embodiments for supporting a personal learning service with the exemplary master device and the exemplary user terminal.

In addition, a method of using a wrong answer note or the like according to learning results of self-examination or the like, which are acquired through a personal learning service and personal learning using a user terminal, will also be described in accordance with another exemplary embodiment.

In the following description of exemplary embodiments, terms such as learning data, learning result, analysis result, etc., will be used. An example of the learning data may be information corresponding to examination questions, and an example of the learning result may be information corresponding to answers input by a user for the examination questions. In addition, an example of the analysis result may be information obtained by grading answers prepared by the user, and analyzing the graded result. That is, the analysis result may include a wrong answer note according to a result of a user's answers to examination questions, an interpretation for a wrong answer, a percentage of wrongly-answered questions, a rate of progress, etc.

Exemplary embodiments will now be described in more detail with reference to the accompanying drawings.

A. Structure of Wireless Communication Network

Structures of wireless communication networks for supporting exemplary embodiments may be provided in at least two forms, according to whether separate equipment for a wireless communication service is provided.

According to an exemplary embodiment, if a wireless communication network is provided with separate equipment for a wireless communication service, a service area may be determined by the equipment for the wireless communication service.

Furthermore, according to another exemplary embodiment, if a wireless communication network is not provided with separate equipment for a wireless communication service, a service area may be determined by a master device for supporting personal learning.

FIG. 1 shows an example of a case in which a wireless communication network for supporting a learning method is provided with separate equipment for a wireless communication service according to an exemplary embodiment. Referring to FIG. 1, a service area 140 for providing a wireless communication service is formed by an access point (AP) 120, and a plurality of user terminals #1 to #4 130-1, 130-2, 130-3, and 130-4 are positioned within the service area. In addition, a master device 110 may perform wireless communication with the AP 120, for example, by being positioned within the service area 140, or the master device 110 may perform wired communication with the AP 120 regardless of its position. In the exemplary embodiment of FIG. 1, it is assumed that wired communication is performed between the master device 110 and the AP 120, though it is understood that another exemplary embodiment is not limited thereto.

The master device 110 supports personal learning for at least one of the user terminals #1 to #4 130-1, 130-2, 130-3 and 130-4 authenticated through the AP 120, wherein the AP 120 may be connected to the master device 110 either wirelessly or through a wire. The master device 110 may be a server or a user terminal among the user terminals 130-1, 130-2, 130-3 and 130-4 in such a manner that the server or the one user terminal performs a master operation. In order to use a user terminal, the capability of the user terminal should be sufficient for supporting the learning method presenting accordance with the present exemplary embodiment.

For this purpose, the master device 110 includes learning data for personal learning. In addition, upon sensing a new user terminal which enters into the service area 140, the master device 110 performs an authentication procedure for the new user terminal through the AP 120. This is performed so as to distribute learning data to authenticated user terminals only among the terminals 130-1, 130-2, 130-3 and 130-4 positioned within the service area 140.

The master device 110 may manage information for the user terminals 130-1, 130-2, 130-3 and 130-4 in terms of each personal learning service for the purpose of authentication of user terminals. In addition, any of various authentication methods for authenticating user terminals are applicable in exemplary embodiments.

If a new authenticated user terminal is present in the service area 140, the master device 110 distributes learning data to the authenticated user terminal through the AP 120. At this time, the learning data distributed to the authenticated user terminal may be differentiated from those distributed to other user terminals. For example, the learning data may be subsequently equal to each other in terms of content but may be different from each other in terms of arrangement. In this case, the master device 110 has various types of learning data which are different from each other.

For example, when questions are distributed as learning data, the master device 110 may provide various types of learning data, each of which contains the same questions that are differently arranged in the learning data, and may randomly distribute one of the various types of learning data to each of the user terminals 130-1, 130-2, 130-3 and 130-4.

However, a situation may be assumed in which a plurality of user terminals 130-1, 130-2, 130-3 and 130-4 are already positioned within the service area 140 prior to initiating the personal learning service. In such a case, it is possible to perform a collective authentication procedure for the user terminals 130-1, 130-2, 130-3 and 130-4 positioned in the service area. In addition, the learning data are distributed to the user terminals authenticated through the collective authentication procedure.

Such a collective authentication procedure simplifies a procedure for distributing learning data to a plurality of user terminals. In addition, when the learning data for a plurality of user terminals is distributed together, it is possible to control the distribution of learning data to a new user terminal which enters into the service area 140 after the distribution of the learning data has been performed. That is, for a user terminal which wishes to receive a personal learning service after a designated time, it is possible to limit an associated service.

Furthermore, the master device 110 monitors whether learning results corresponding to the distributed learning data are reported from the user terminals #1 to #4 130-1, 130-2, 130-3 and 130-4 that have received the learning data through the AP 120.

The learning results from the user terminals #1 to #4 130-1, 130-2, 130-3 and 130-4 may be collected by the master device 110 through voluntary or compulsory uploading.

The voluntary uploading refers to a method by which, according to a request of one or more user terminals that have completed a personal learning operation based on distributed learning data, the master device 110 collects learning results uploaded from the corresponding user terminals.

The compulsory uploading refers to a method by which, after a predetermined length of time has passed after the distribution of learning data or according to the request of the operator of the master device 110, an instruction to upload the learning results are rendered to the user terminals 130-1, 130-2, 130-3 and 130-4, and the learning results uploaded from all of the user terminals 130-1, 130-2, 130-3 and 130-4 according to the instruction are collected in a batch.

It is understood that another exemplary embodiment is not limited to the above-described methods. For example, according to another exemplary embodiment, the master device 110 may implement the above-described methods in combination. Moreover, in the case of voluntary uploading, the master device 110 may perform an authentication from each user terminal which uploads learning result, and in the case of compulsory uploading, the master device 110 may perform authentication from all of the user terminals 130-1, 130-2, 130-3 and 130-4 together at the time when the collection of learning results for all of the user terminals 130-1, 130-2, 130-3 and 130-4 is completed.

The master device 110 analyzes the learning results collected from the user terminals 130-1, 130-2, 130-3 and 130-4, and stores the analysis results by user terminals. In addition, the master device 110 feeds back the analysis results by user terminals to corresponding terminals 130-1, 130-2, 130-3 and 130-4.

If the analysis results are fed back in real time after the collection of learning results, the master device may not perform the authentication of a corresponding user terminal after the collection of learning results from the terminal. In this exemplary case, the authentication procedure is not repetitively performed so as to feed back analysis results. However, it is understood that another exemplary embodiment is not limited thereto. For example, according to another exemplary embodiment, authentication may be performed after the collection of learning results and again so as to transmit the analysis results that correspond to the learning results, respectively.

The AP 120 forms a service area 140 corresponding to a capability of the AP 120, and enables wireless communication with the user terminals #1 to #4 130-1, 130-2, 130-3 and 130-4 existing within the service area 140.

In particular, the AP 120 distributes the learning data provided from the master device 110 to the user terminals #1 to #4 130-1, 130-2, 130-3 and 130-4, and transmits the analysis results received from the user terminals #1 to #4 130-1, 130-2, 130-3 and 130-4 to the master device 110. In addition, the AP 120 transmits the analysis results, which are provided from the master device 110 by user terminals, to the corresponding terminals 130-1, 130-2, 130-3 and 130-4.

When it is sensed that the user terminals #1 to #4 130-1, 130-2, 130-3 and 130-4 enter into the service area 140, channels for wireless communication with the AP 120 are assigned to the user terminals #1 to #4 130-1, 130-2, 130-3 and 130-4, respectively. In addition, if the user terminals #1 to #4 130-1, 130-2, 130-3 and 130-4 wish to receive a personal learning service, the user terminals #1 to #4 130-1, 130-2, 130-3 and 130-4 request association to the master device 110 through the AP 120. Also, the user terminals #1 to #4 130-1, 130-2, 130-3 and 130-4 may perform an authentication procedure with the master device 110.

If the authentication is approved from the master device 110 through the authentication procedure, the user terminals #1 to #4 130-1, 130-2, 130-3 and 130-4 receive the learning data distributed from the master device 110. The user terminals #1 to #4 130-1, 130-2, 130-3 and 130-4 execute the personal learning service using the received learning data.

If the personal learning service is completed, or an up-loading request from the master device 110 is received, the user terminals #1 to #4 130-1, 130-2, 130-3 and 130-4 transfer the learning results according to the personal learning to the master device 110 through the AP 120.

The user terminals #1 to #4 130-1, 130-2, 130-3 and 130-4 receive analysis results corresponding to the learning results from the master device 110 through the AP 120. In addition, the user terminals #1 to #4 130-1, 130-2, 130-3 and 130-4 may store the received analysis results, and allow a user to perform personal learning using the analysis results, as desired.

Figure 2:
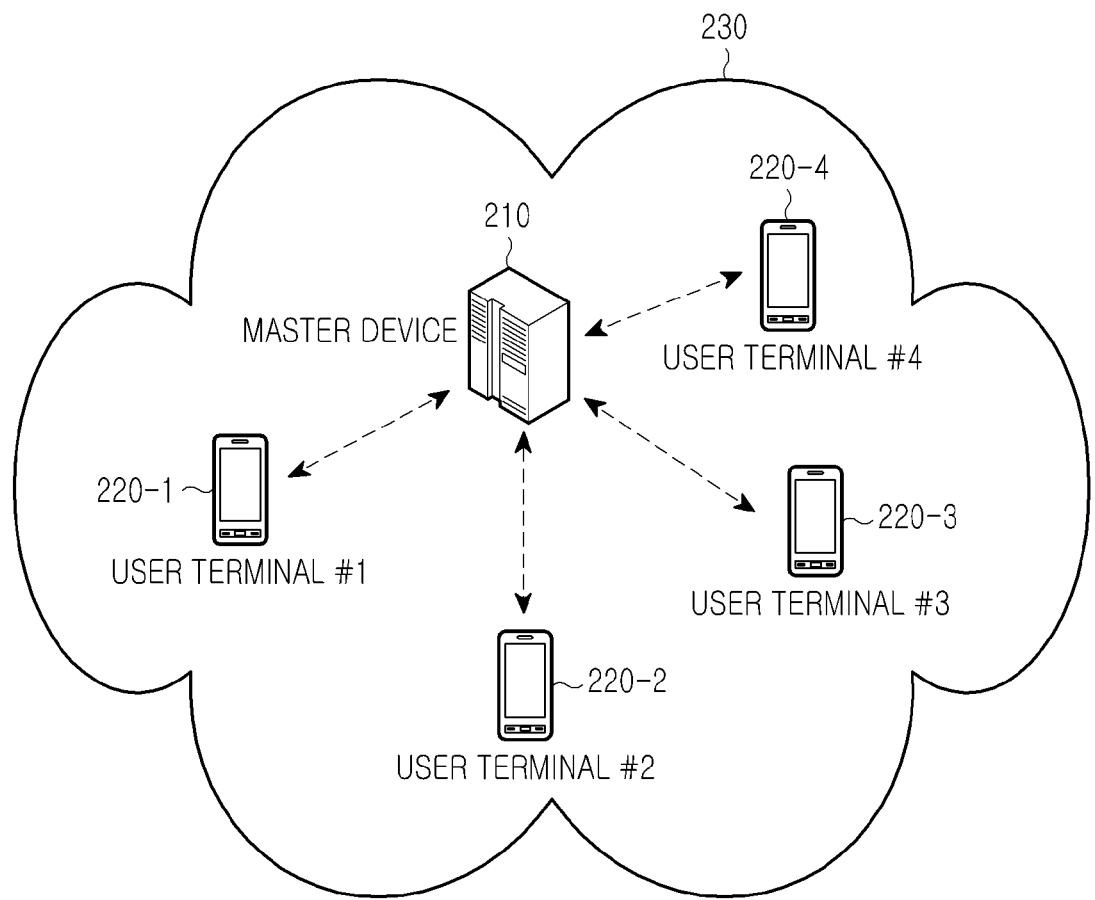
FIG. 2 shows an example of a case in which a wireless communication service is directly supported by a master device in a wireless communication network for supporting a learning method according to an exemplary embodiment.

FIG. 2 shows an example of a case in which a wireless communication service is directly supported by a master device 210 in a wireless communication network for supporting a learning method according to an exemplary embodiment. The wireless communication network shown in FIG. 2 has a structure in which a master device 210 directly transfers information through wireless communication with user terminals #1 to #4 130-1, 130-2, 130-3 and 130-4 in a service area 230, rather than through an AP for wireless communication like the wireless communication network of FIG. 1. The description of other constructions and operations are omitted herein since they are the same or similar to those described above with reference to FIG. 1.

B. Signaling

The following description presents two exemplary embodiments of signaling between user terminals and a master device so as to support personal learning in a wireless communication network according to an exemplary embodiment.

According to a first exemplary embodiment, there is provided a method that distributes learning data only when there is a request from a user terminal, and uploads learning results to the master device in response to the request of the user terminal.

According to a second exemplary embodiment, there is provided a method that distributes learning data to an authenticated user terminal regardless of a request of the user terminal, and that uploads the learning result from the user terminal to the master device in response to the request of the master device.

As an example, it is possible to divide each of the above-described exemplary signaling procedures, which can be executed between a user terminal and a master device for the purpose of personal learning as described above, into three phases. That is, each exemplary signaling procedure may be divided into an association phase for authenticating a user terminal, a propagation phase for distributing learning data to the user terminal, and a report phase for collecting learning results by a master device or for transferring analysis results for the learning results to the user terminal.

Signaling in a wireless communication network according to an exemplary embodiment to be described below is based on the wireless communication network shown in FIG. 2. However, it is understood that another exemplary embodiment is not limited thereto. For example, the signaling in a wireless communication network according to another exemplary embodiment may be based on the wireless communication network shown in FIG. 1. In this case, the actions may be the same as or similar to those based on the wireless communication network shown in FIG. 2, except that information between the master device and the user terminals is transmitted by the AP.

Figure 3:
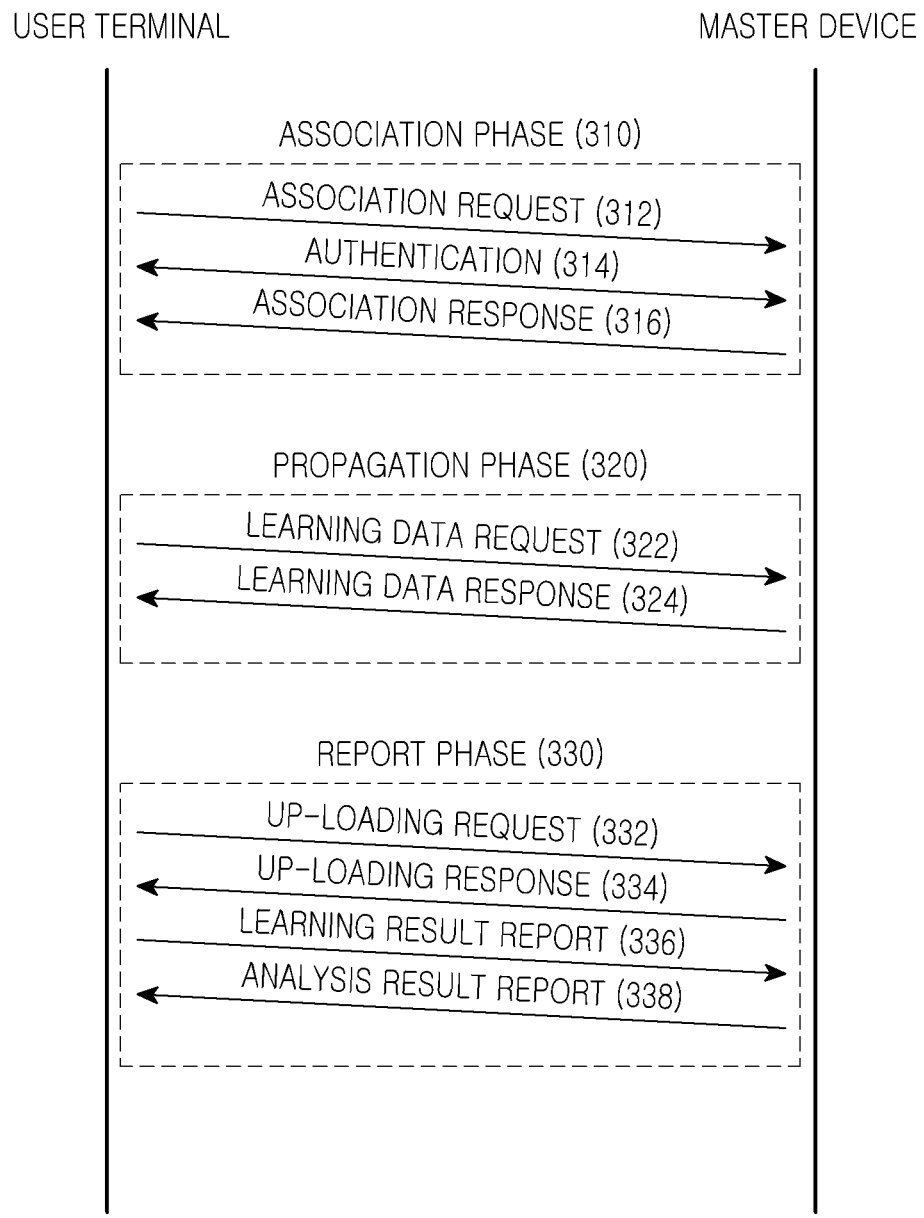
FIG. 3 shows a signaling procedure in which information transmission is executed in a wireless communication network by a request of a user terminal for a learning method according to an exemplary embodiment.

FIG. 3 shows a signaling procedure in which information transfer is executed in response to a request of a user terminal in a wireless communication network for a learning method according to an exemplary embodiment. Referring to FIG. 3, if a user terminal enters into an area enabling a personal learning service, the user terminal and the master device execute a signaling procedure corresponding to an association phase 310.

In the association phase 310, upon recognizing that the user terminal has entered into an area enabling a personal learning service, the user transmits renders an association request to the master device in operation 312. If the association request is transmitted from the user terminal, the master device executes an authentication procedure for the user terminal in operation 314. Upon successfully authenticating the user terminal in the authentication procedure, the master device transmits, to the user terminal, an association response message to inform the user terminal that the user terminal has been successfully authenticated in operation 316.

However, if the authentication of the user terminal fails, the master device transmits, to the user terminal, an association response message informing that the authentication has failed in operation 316. Furthermore, if the authentication has failed, an additional procedure for providing a personal learning service to the user terminal is not performed.

If the association phase 310 is successfully executed as described above, a signaling procedure corresponding to a propagation phase 320 is executed.

In the propagation phase 320, the user terminal transmits a learning data request to the master device in operation 322 for personal learning. If the learning data request is received from the user terminal, the master device extracts learning data for the personal learning service. In addition, the master device distributes the extracted learning data to the user terminal in operation 324 in response to the learning data request.

Meanwhile, the user terminal executes the personal learning service on the basis of the learning data distributed from the master device, and executes a signaling procedure corresponding to a report phase 330 at the time of completing the personal learning service.

In the report phase 330, the user terminal transmits, to the master device, an uploading request to upload the results for the personal learning service executed on the basis of the learning data in operation 332. As an example, the user terminal may transmit the learning result uploading request when a preset learning termination time passes. In such a case, the learning termination time may be set in advance by an instruction of the user master device.

In response to the request, the master device transmits, to the user terminal, an uploading response message for approving uploading in operation 334. For example, the master device may approve the user terminal's uploading in consideration of its own business load.

Upon receiving the response message from the master device, the user terminal reports the learning results according to the personal learning service to the master device in operation 336. The master device collects the learning results reported from the user terminal.

In addition, the master device analyzes the collected learning results and, in operation 338, the master device transmits the analysis results to the user terminal. Upon receiving the analysis results from the master device, the user terminal may store the received analysis results. In this case, the user terminal may refer to the stored analysis results at the time of a personal learning service to be executed subsequently.

Figure 4:
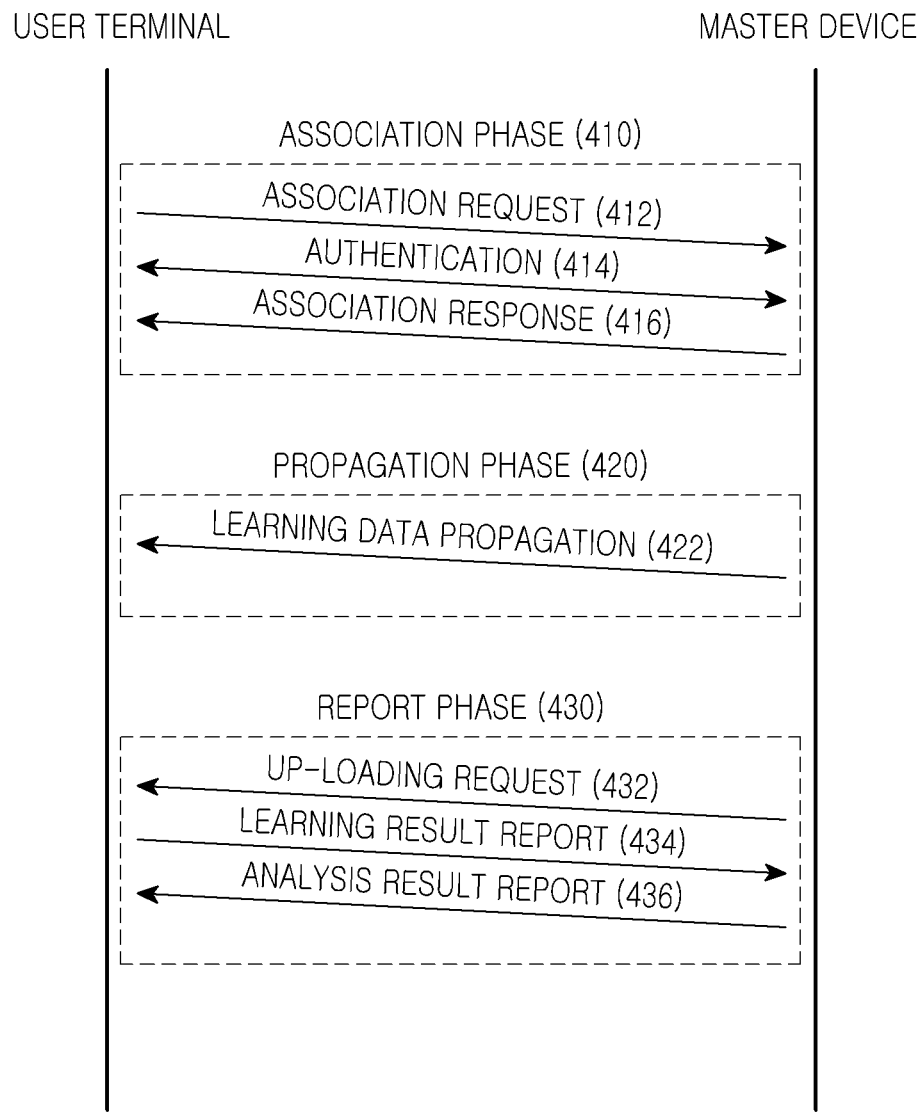
FIG. 4 shows a signaling procedure in which information transmission is executed in a wireless communication network by a request of a master device for a learning measure according to an exemplary embodiment.

FIG. 4 shows a signaling procedure in which information transmission is executed by a request of a master device in a wireless communication network for a learning method according to an exemplary embodiment. Referring to FIG. 4, when the user terminal enters into an area enabling a personal learning service, the user terminal and the master device execute a signaling procedure corresponding to an association phase 410.

In the association phase 410, upon recognizing that the user terminal has entered into an area enabling a personal learning service, the user terminal transmits an association request to the master device in operation 412. If the association request transmitted from the user terminal is received by the master device, the master device executes an authentication procedure for the user terminal in operation 414. Upon successfully authenticating the user terminal through the authentication procedure, the master device transmits, to the user terminal, an association response message to inform the user terminal that the user terminal has been successfully authenticated in operation 416.

However, when the authentication for the user terminal fails, the master device transmits, to the user terminal, an association response message (for informing that the authentication has failed in operation 416. Furthermore, if the authentication has failed, an additional procedure for providing a personal learning service to the user terminal is not performed.

If the association phase 410 is successfully executed as described above, a signaling procedure corresponding to a propagation phase 420 is executed.

In the propagation phase 420, the master device propagates learning data to a user terminal positioned within a service area in operation 422. In such a case, the master device may code and propagate the learning data so that the propagated learning data can be received only by an authenticated user terminal. A coding method used in this case may be determined or exchanged in advance with the authenticated user terminal.

Meanwhile, the user terminal executes the personal learning service on the basis of the learning data distributed from the master device, and executes a signaling procedure corresponding to a report phase 430 for transmitting learning results in response to a request from the master device.

In the report phase 430, in an event related to the termination of the personal learning service, the master device transmits a learning result uploading request to the user terminal in operation 432. As an example, the event related to the personal learning termination may correspond to a case in which a predetermined length of time lapses from one of a time point when learning data is distributed to each of user terminals, a time point when learning data is firstly distributed, and a time point when learning data is collectively distributed to all of the user terminals. In addition, a case in which a preset learning termination time lapses may be considered as an event related to the personal learning termination.

If the uploading request is received by the user terminal, the user terminal reports learning results according to the personal learning service to the master device in operation 434. The master device collects the learning results reported from the user terminal, and may store the collected learning results.

In addition, the master device analyzes the collected learning results, and reports the analysis result to the user terminal in operation 436. Upon receiving the analysis result from the master device, the user terminal may store the analysis result. In this case, the user may refer to the stored analysis result at the time of a personal learning service to be subsequently performed.

C. Construction and Action of Master Device

Now, a construction of a master device in accordance with an exemplary embodiment, and actions of the master device executed so as to support personal learning by a user terminal will be described in more detail.

Figure 5:
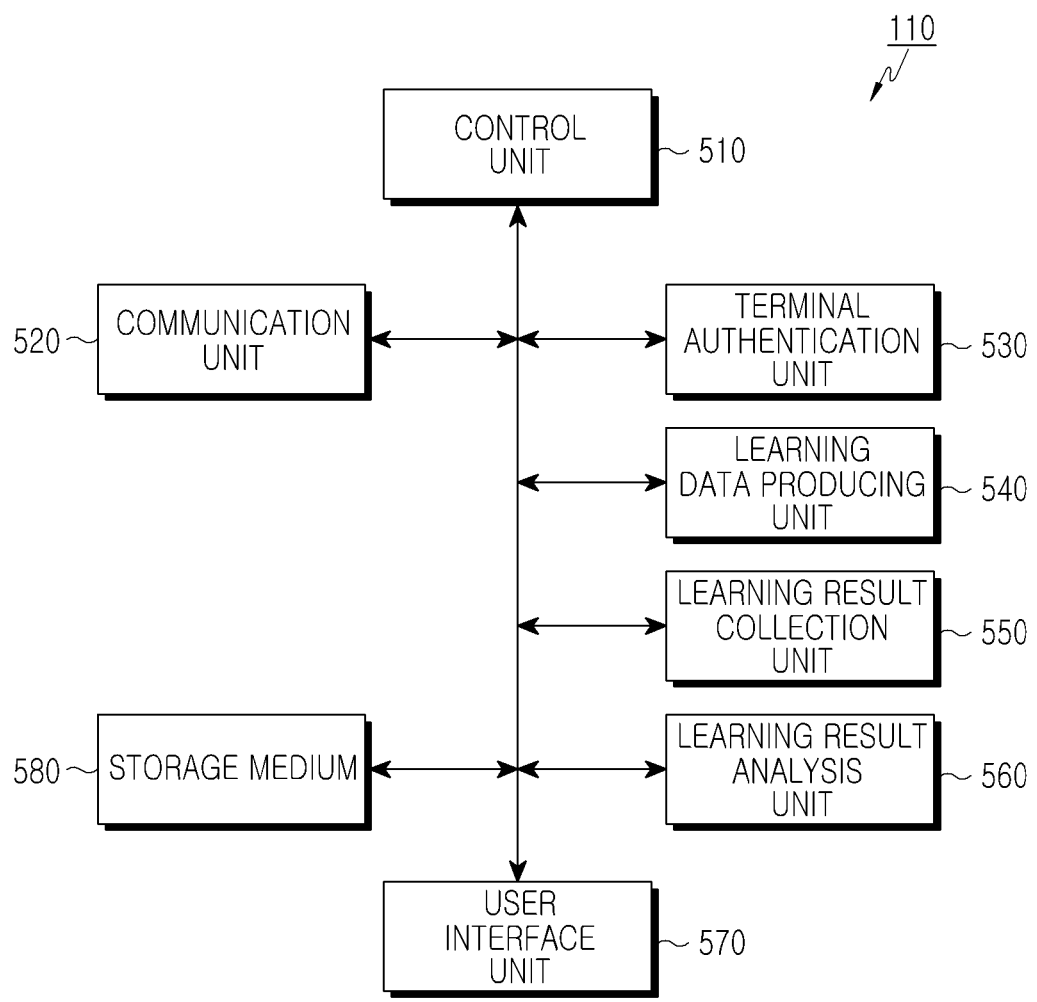
FIG. 5 shows a construction of a master device according to an exemplary embodiment.

FIG. 5 shows a construction of a master device 110 according to an exemplary embodiment. Referring to FIG. 5, the master device 110 includes a control unit 510, a communication unit 520, a terminal authentication unit 530, a learning data producing unit 540, a learning result collection unit 550, a learning result analysis unit 560, a user interface unit 570, and a storage medium 580. While the present exemplary embodiment provides the master device 110 with the storage medium 580, it is understood that the storage medium 580 may be externally provided or omitted according to another exemplary embodiment. Moreover, while not required, each of the units 510, 520, 530, 540, 550, 560, 570, and 580 can be one or more processors or processing elements on one or more chips or integrated circuits.

The control unit 510 controls actions for supporting personal learning performed using a user terminal. In particular, the control unit 510 executes a control for authenticating a user terminal which has entered into a service area in which a personal learning service is supported.

In addition, the control unit 510 controls actions for distributing learning data to the authenticated user terminals, and for collecting learning results on the basis of the distributed learning data from the user terminals. For example, the control unit determines a time point for collecting learning results, and controls actions for collecting learning results by user terminals at the determined time point. The time point for collecting learning results may be determined in consideration of a learning data distribution time or a preset learning termination time, as described above. However, it is understood that another exemplary embodiment is not limited thereto. For example, according to another exemplary embodiment, to the control unit 510 may control the actions for collecting learning results passively in response to a request from a user terminal without determining the time point for collecting learning results.

In addition, the control unit 510 controls an analyzing of the learning results collected from the user terminals, and a feeding back of the analyzed results to the corresponding users of the user terminals.

The communication unit 520 exchanges information with a user terminal through wireless communication under the control of the control unit 510. In particular, the communication unit 520 transmits learning data to be distributed and analysis results based on the learning results received from each of the user terminals to the user terminals, and receives the learning results based on the distributed learning data from the user terminals.

If an association request is received from a user terminal, the terminal authentication unit 530 performs authentication of the user terminal, under the control of the control unit 510. The terminal authentication unit 530 transmits the authentication result to the communication unit 520 under the control of the control unit 510, so that the authentication result can be provided to the user terminal.

A learning data producing unit 540 produces learning data under the control of the control unit 510. For example, the learning data producing unit 540 processes the same learning data to produce different learning data, and stores the processed learning data in the storage medium 580 or transmits the processed learning data to user terminals through the communication unit 520, under the control of the control unit 510. As an example, the learning data producing unit 540 may process learning data supplied from an outside source so as to produce the learning data.

The learning result collection unit 550 collects learning results received from each user terminal through the communication unit 520 under the control of the control unit 510. In addition, under the control of the control unit 510, the learning result collection unit 550 stores collected learning results in the storage medium 580 in real time or transmits the learning results to the learning result analysis unit 560. Moreover, the learning result collection unit 550 may keep the received learning results until learning results are collected from all of the user terminals, under the control of the control unit 510. In this case, after collecting learning results from all of the user terminals, the learning result collection unit 550 transmits the collected learning results to the recording medium 580 or to the learning result analysis unit 560.

The learning result analysis unit 560 analyzes the learning results stored in the storage medium 580 or the learning results transmitted from the learning result collection unit 550. For example, the learning result analysis unit 560 produces information related to at least one of a rate of learning progress, a percentage of wrongly answered questions, and a wrong answer note according to an interpretation and a solving course for a wrong answer for each of the user terminals, under the control of the control unit 510.

In addition, the learning result analysis unit 560 stores the results according to the analysis in the storage medium 580 or transmits the results to the corresponding user terminals through the communication unit 520, under the control of the control unit 510.

The user interface unit 570 executes an operation for exchanging information with a user who operates the master device. That is, under the control of the control unit 510, the user interface unit 570 provides at least one of the learning results produced by the learning data producing unit 540, the learning results collected from the user terminals, or the analysis results for the learning results in a format that is recognizable by the user. In addition, under the control of the control unit 510, the user interface unit 570 stores information inputted by the user, e.g., data for producing learning data or the like, in the storage medium 580 or transmits the information to the learning data producing unit 540.

Under the control of the control unit 510, the storage medium 580 may store at least one of the learning data produced from the learning data producing unit 540, the learning results collected by the learning result collection unit 550, the results analyzed by the learning result analysis unit 560, and the user data input through the user interface 570. In addition, under the control of the control unit 510, the storage medium 580 provides one or more requested information items among the stored information items in a corresponding configuration.

Figure 6:
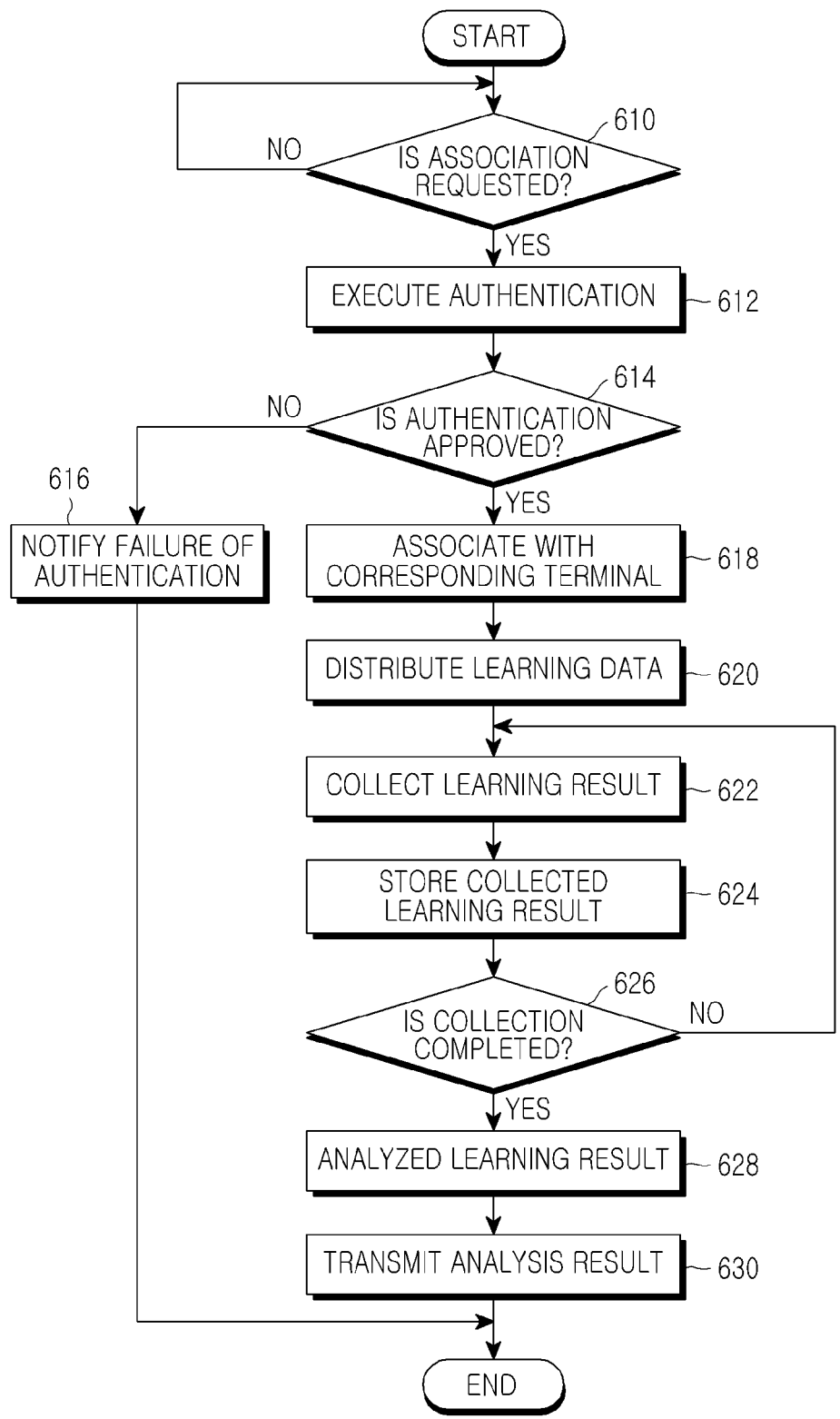
FIG. 6 illustrates a flowchart of operations of a master device according to an exemplary embodiment.

FIG. 6 illustrates a flowchart of operations of a master device according to an exemplary embodiment. Referring to FIG. 6, the master device determines whether there is an association request from a user terminal in operation 610. If it is determined that there is an association request from a user terminal, the master device executes an authentication procedure for the user terminal in operation 612.

In addition, the master device determines whether authentication for the user terminal is successful through the authentication procedure in operation 614. If the authentication for the user terminal fails, the master device proceeds to operation 616, and informs the user terminal of the failure of authentication. In this case, the master device does not execute an action for personal learning for the user terminal.

However, if the authentication of the user terminal is successful, the master device executes association with the user terminal in operation 618. In addition, the master device distributes learning data to the authenticated user terminal in operation 620. The learning data may be transmitted in response to a request of the authenticated user terminal, may be transmitted at a predetermined time, may be repeatedly transmitted within a predetermined period, etc. If the learning data is distributed at the predetermined time, to the master device need not wait for the learning data request of the authenticated user terminal. Accordingly, in such a case, the actions for distributing learning data can be simplified. If the learning data is merely repeatedly transmitted within a predetermined period, a measure for preventing a non-authenticated user terminal from receiving the learning data may be implemented. For example, the learning data may be transmitted after encoding the data using an encoding technique.

In addition, it is possible to distribute learning data to all of the authenticated user terminals in a batch at the time when a set number of user terminals are authenticated, rather than each time when an authenticated user terminal occurs or at a predetermined time. Distributing the learning data in a batch in this manner may further simplify resources and procedures. In such a case, a measure for preventing a non-authenticated terminal from receiving the learning data may be implemented.

If the distribution of learning data is completed, the master device may execute a personal learning process by a user terminal provided with the learning data. The personal learning process may be executed with the cooperation of the master device and a user terminal, or by the user terminal alone.

The master device collects learning results transmitted from user terminals provided with the learning data in operation 622. The collection of the learning results may be executed in response to the request of a corresponding user, or by transmitting an instruction to the user terminals which are executing the personal learning service at the time when a preset event occurs. Here, the preset event may be one of a case in which a length of time given to each of the user terminals for personal learning lapses, a case in which a predetermined length of time lapses from a time point when the personal learning service was collectively started for the user terminals, and a case in which a preset time is reached.

In operation 624, the master device stores the collected learning results, and in operation 626, the master device determines whether learning results are collected from all of the user terminals provided with the learning data. If the learning results are not collected from all of the user terminals, the master device proceeds to operation 622, and continuously collects and stores the learning results. In such a case, the master device may transmit an instruction so that learning results are compulsorily transmitted from the user terminals that have not yet transmitted the learning results.

However, if the learning results are collected from all of the user terminals, the master device proceeds to operation 628, and analyzes the collected learning results. By analyzing the collected learning results, the master device generates information related to, for example, at least one of a rate of learning progress, a percentage of wrongly answered questions, and a wrong answer note according to an interpretation and a solving course for a wrong answer for each of the user terminals.

If the analysis for the collected learning results is completed, the master device transmits analyzed results to the corresponding terminals in operation 630. In addition, although not shown, the analyzed results may be stored by user terminals, so that the results can be subsequently used.

D. Construction and Action of User Terminal

Now, a construction of a user terminal in accordance with an exemplary embodiment and actions executed by the user terminal for personal learning will be described in more detail.

Figure 7:
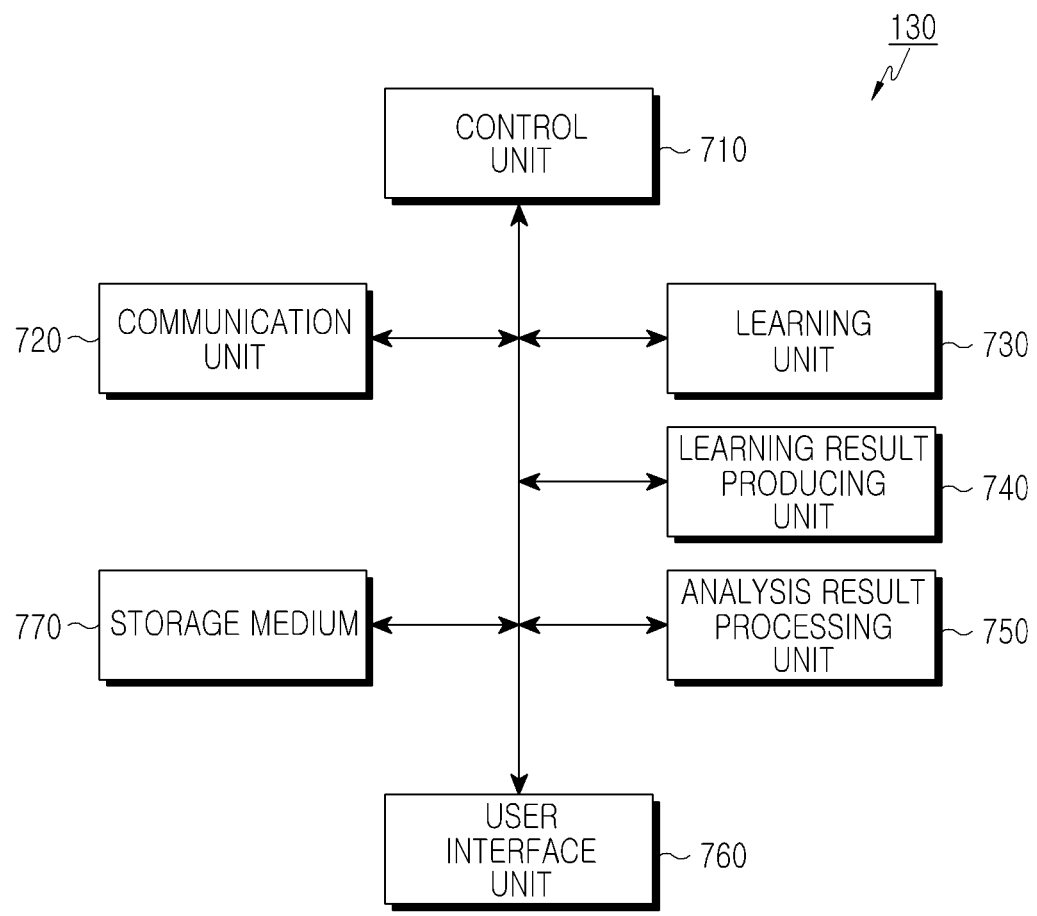
FIG. 7 shows a construction of a user terminal for supporting an electronic book function according to an exemplary embodiment.

FIG. 7 shows a construction of a user terminal 130 for supporting an electronic book function according to an exemplary embodiment. Referring to FIG. 7, the user terminal 130 includes a control unit 710, a communication unit 720, a learning unit 730, a learning result producing unit 740, an analysis result processing unit 750, a user interface unit 760, and a storage medium 770. While the present exemplary embodiment provides the user terminal 130 with the storage medium 770, it is understood that the storage medium 770 may be externally provided or omitted according to another exemplary embodiment. Moreover, while not required, each of the units 710, 720, 730, 740, 750, 760, and 770 can be one or more processors or processing elements on one or more chips or integrated circuits.

The control unit 710 controls actions according to a personal learning service. In particular, the control unit 710 recognizes that the user terminal 130 has entered into a service area in which the personal learning service is supported, and performs a control for an association with the master device when it is recognized that the user terminal 130 has entered into the service area.

In addition, when authentication by the master device is successful, the control unit 170 performs a control for executing the personal learning service using learning data provided from the master device. In addition, the control unit 510 performs a control for producing results according to the personal learning service, and transmitting the results to the master device. At this time, the control unit 510 may determine a time point to transmit the learning results to the master device. For example, the time point to transmit the learning results may be determined according to an instruction from the master device or on the basis of a preset learning termination time point. Furthermore, the control unit 710 performs a control for processing the analysis results provided from the master device.

The communication unit 720 exchanges information with the master device through wireless communication under the control of the control unit 710. In particular, the communication unit receives the learning data and analysis results from the master device, and transmits the learning results obtained on the basis of the learning data to the master device.

The learning unit 730 executes the personal learning service using the learning data distributed from the master device under the control of the control unit 710. For this purpose, under the control of the control unit 710, the learning unit 730 provides information used for learning to the user through the user interface unit 760, and receives information inputted by the user through the user interface unit 760, thereby executing the personal learning service.

Under the control of the control unit 710, the learning result producing unit 740 monitors the personal learning service executed by the learning unit 730, and produces learning results according to the personal learning service when the personal learning service is completed. In addition, the learning result producing unit 740 stores the produced learning results in the storage medium 770 or uploads the learning results to the master device through the communication unit 720.

The analysis result processing unit 750 is provided with the analysis results from the master device through the communication unit 720, and processes the analysis results under the control of the control unit 710. The analysis result processing unit 750 may provide the processing result to the user interface unit 760 so that the user can confirm the analysis results. In addition, the analysis results may be transmitted to and stored in the storage medium 770.

The user interface unit 760 performs an operation for exchanging information with the user of the user terminal 130 under the control of the control unit 710. That is, the user interface unit 760 may provide information according to at least one of the personal learning service executed by the learning unit 730, the learning results produced by the learning result producing unit 730, and the result processed by the analysis result processing unit 750 in a form that is recognizable by the user. In addition, the user interface unit 760 stores information input by the user, e.g., information input for personal learning in the storage medium 770, or transmits the information to the learning unit 730 under the control of the control unit 710.

The storage medium 770 may store at least one of the learning results produced by the learning result producing unit 740, the result processed by the analysis result processing unit 750, etc., under the control of the control unit 710. In addition, the storage unit 770 provides a requested information item among the stored information items to a corresponding component under the control of the control unit 710.

Figure 8:
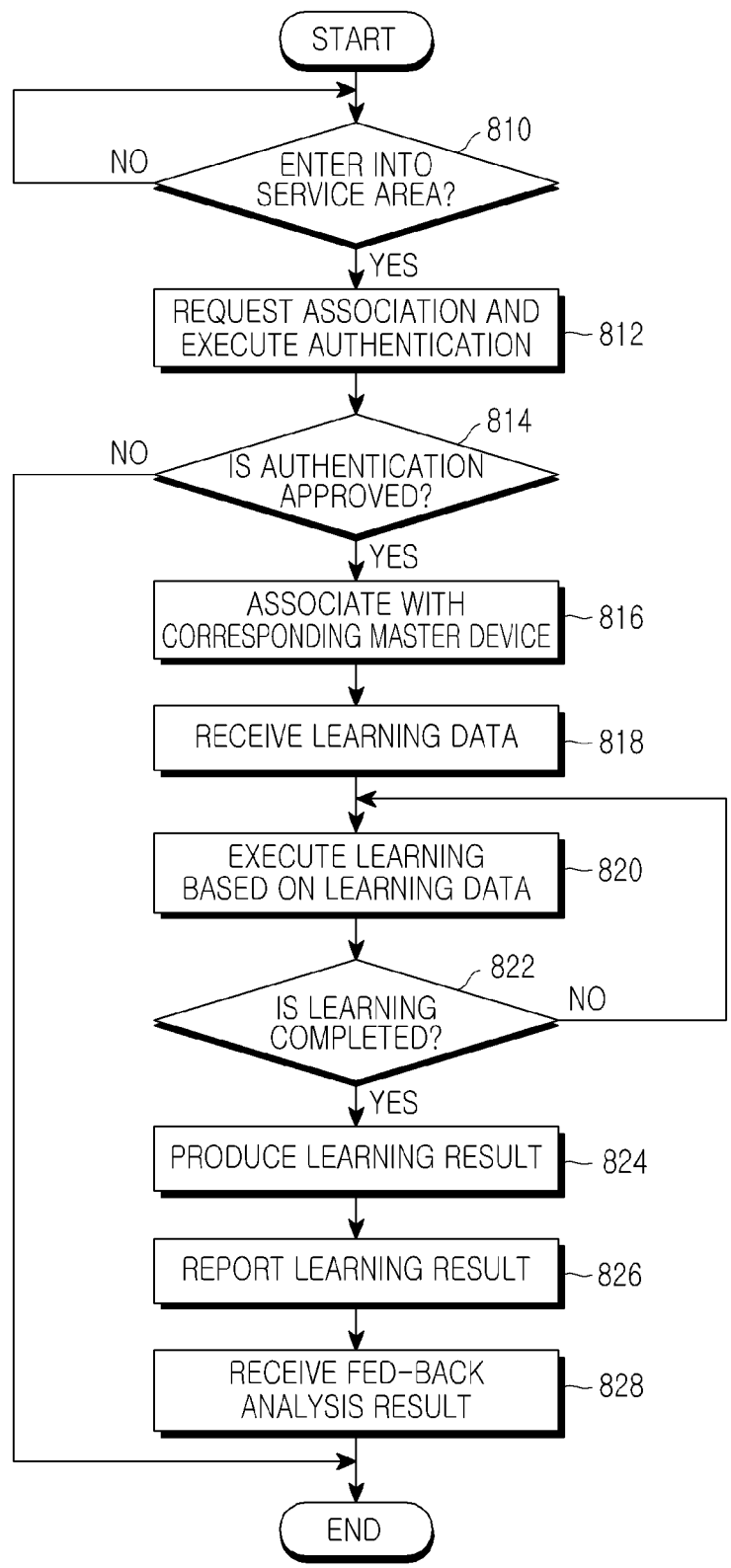
FIG. 8 illustrates a flowchart of operations of a user terminal according to an exemplary embodiment.

FIG. 8 illustrates a flowchart of operations of a user terminal according to an exemplary embodiment. Referring to FIG. 8, the user terminal monitors whether the user terminal has entered into a service area in which a personal learning service by a master device is provided in operation 810. If it is determined that the user terminal has entered into the service area through the monitoring, the user terminal proceeds to operation 812, and transmits an association request to the master device. In addition, the user terminal executes an authentication procedure with the master device in accordance with the request.

The user terminal monitors whether authentication with the master device is successful in operation 814. If the user terminal is notified by the master device that the authentication has failed, the user terminal terminates the personal learning service.

However, if the authentication with the master device is successful, the user terminal performs an association with the master device in operation 816. In addition, the user terminal receives learning data distributed by the master device in operation 818.

The learning data may be distributed in response to a learning data request to the master device, may be repeatedly transmitted within a predetermined period by the master device, may be transmitted at a predetermined time by the master device, etc. If the learning data is distributed within the predetermined period, the user terminal need not request the learning data. Therefore, in such a case, an action for receiving the learning data distributed by the master device may be simplified. Moreover, if the learning data is repeatedly distributed, the learning data may be encoded. As such, an action for decoding the encoded learning data is performed by the user terminal.

Moreover, the user terminal may receive the learning data distributed in a batch to a set number of user terminals by the master device at a time when the set number of user terminals are authenticated, rather than distributing the learning data each time when authentication for a user terminal is approved or within a predetermined period. If the learning data is distributed in a batch, resources and procedures may be simplified. In such a case, processes for decoding encoded learning data may also be implemented.

Upon receiving the learning data from the master device, the user terminal proceeds to operation 820, and executes a personal learning service using the received learning data. The user terminal may execute the personal learning service without cooperation from the master device or in cooperation with the master device.

In operation 822, the user terminal continuously monitors whether the personal learning service is completed. As examples, the personal learning service may be completed by the user of the user terminal, or may be completed by an instruction from the master device when a preset event occurs. Here, the preset event may be one of a case in which a length of time given to each user terminal for personal learning lapses, a case in which a predetermined length of time lapses from the time when the personal learning is collectively initiated for the user terminals, and a case in which a preset time is reached.

If it is determined that the personal learning service is completed, the user terminal produces learning results according to the personal learning service in operation 824, and uploads the produced learning results to the master device in operation 826. If the uploading of the learning results is completed, the user terminal waits until an analysis result for the learning results is fed back from the master device in operation 828. In addition, if the analysis result for the learning results is fed back from the master device, the user terminal process the analysis result fed back from the master device and may store the analysis result. In addition, the user terminal may output the analysis result so that the user can confirm the analysis result.

Figure 9:
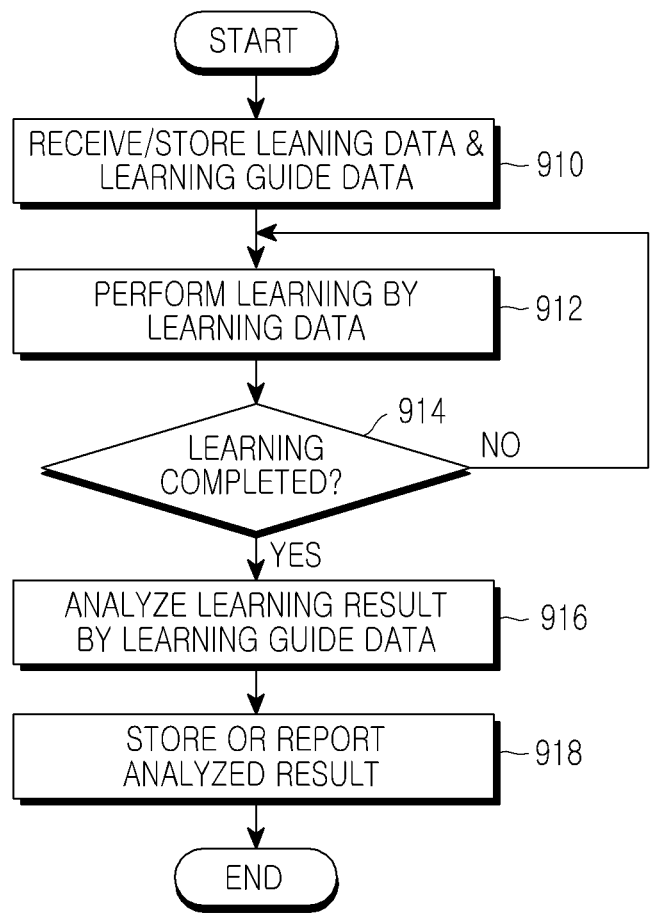
FIG. 9 illustrates a flowchart of operations of a user terminal according to another exemplary embodiment.

FIG. 9 illustrates a flowchart of operations of a user terminal according to another exemplary embodiment. Referring to FIG. 9, a user terminal receives and stores learning data and learning guide data in operation 910. Here, the learning data is data to be used by a learner for a personal learning service, and the learning guide is data to be used for guiding the user in the personal learning service. For example, the learning data may be information for examination questions, and the learning guide data may be information of answers for the examination questions.

Moreover, a Digital Right Management (DRM) operation may be used so as to assure that only the authorized users can use the learning guide data. Here, the DRM operation refers to any technology to be used by a publishing company or a copyright owner for controlling the use of digital data or hardware distributed thereby and for restricting the digital data or hardware to be used for an intended purpose.

A communication network or a user interface may be used for inputting the learning data and the learning guide data to the user terminal. For example, when using a communication network, it is possible to provide the learning data and the learning guide data from an external apparatus through a wireless or wired network. In addition, when using a user interface, it is possible to associate the user interface with a memory card or the like, so that the learning data and the learning guide data recorded in the memory card or the like can be transferred to the user terminal.

Upon receiving a personal learning request from a learner, the user terminal proceeds to operation 912, and performs a personal learning service, using the previously stored learning data. In addition, the user terminal continuously monitors whether the personal learning service is completed in operation 914. The personal learning service may be completed by the user of the user terminal, or may be completed when a preset event occurs. Here, the event may be one of a case in which a length of time given to each of the user terminals for personal learning lapses, a case in which a predetermined length of time lapses from a time point when personal learning was collectively started for the user terminals, and a case in which a preset time is reached.

If it is determined that the personal learning service is completed, the user terminal analyzes learning results in operation 916, using the results according to the personal learning service and the previously stored learning guide data. At this time, in order to use the learning guide data, a procedure may be executed for confirming whether the user terminal is authorized to use the learning guide data. In addition, through the analysis of the learning data, it is possible to acquire at least one of a wrong answer note, an interpretation of a wrong answer, a percentage of wrongly answered questions, a rate of learning progress, etc., according to the solving result for the examination questions.

In operation 918, the user terminal may store or report the analyzed result to the user through the user interface so that the user can confirm the result.

While exemplary embodiments have been shown and described with reference to the drawings, it will be understood by those skilled in the art that various changes in form and details may be made therein without departing from the spirit and scope of the inventive concept as defined by the appended claims.

For example, new information may be input through additional learning using the information acquired through the analysis of the learning result. The new information may be used in the wrong answer note or the like. In addition, it is also possible to use an exemplary embodiment in combination with additional operations, such as time checking, security management, etc., in connection with a personal learning service (e.g., an examination).

When an examination is given by applying one or more exemplary embodiments, the examination can be fairly executed by applying a DRM technology to the user terminals which support an electronic book function, thereby providing any other function besides the functions related to an examination.

While not restricted thereto, an exemplary embodiment can also be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, while not required in all aspects, one or more units of the master device and the user terminal can include a processor or microprocessor executing a computer program stored in a computer-readable medium.

What is claimed is:

1. A personal learning method of a device, the personal learning method comprising:
    receiving, by the device, an association request from at least one terminal, distinct from the device, entering into a predetermined service area, established and defined by the device, enabling a personal learning service by the device;
    authenticating, by the device, the at least one terminal in response to the received association request;
    distributing, by the device, learning data to the authenticated terminal; and
    receiving, by the device, a learning result based on a uploading request of the learning result related to the learning data from the authenticated terminal.

2. The personal learning method as claimed in claim 1, wherein the learning data is information corresponding to examination questions, and the learning result is information corresponding to answers to the examination questions.

3. The personal learning method as claimed in claim 1, wherein the receiving the learning result comprises:

determining whether the uploading request is received from the authenticated terminal;
    approving an uploading of the learning result by the terminal if the uploading request is determined to have been received from the authenticated terminal according to the determining; and
    receiving the learning result from the terminal.

4. The personal learning method as claimed in claim 1, wherein the receiving the learning result comprises:
    determining whether a preset learning termination time is reached or whether a preset length of time lapses from a time point if the learning data is distributed to the terminal, a time point when the learning data is first distributed to a terminal among a plurality of terminals in the area, or a time point when the learning data is distributed in a batch to the plurality of terminals; and
    receiving the learning result from the authenticated terminal if it is determined that the preset learning termination time is reached or the preset length of time lapses.

5. The personal learning method as claimed in claim 4, wherein the receiving the learning result comprises:
    transmitting a learning result submission request to the authenticated terminal to request submission of the learning result; and
    receiving the learning result from the authenticated terminal in response to the transmitted learning result submission request.

6. The personal learning method as claimed in claim 1, wherein the distributing the learning data further comprises distributing first learning data, which is randomly selected from the various types of learning data, to the authenticated terminal and distributing second learning data, which is randomly selected from various types of learning data according to a later authentication time of another authenticated terminal, to the other authenticated terminal within the area.

7. The personal learning method as claimed in claim 6, wherein the various types of learning data are different from each other in terms of fields, or are identical to each other in terms of contents but different from each other in terms of arrangements of the contents.

8. The personal learning method as claimed in claim 1, further comprising analyzing, automatically the received learning result, and feeding back the analyzed result to the authenticated terminal.

9. The personal learning method as claimed in claim 8, wherein the analyzed result comprises at least one of information related to an interpretation for wrong answers, a percentage of wrongly answered questions, and a rate of learning progress.

10. The personal learning method as claimed in claim 1, wherein the distributing the learning data further comprises:
    performing a collective authentication of a plurality of terminals within the area; and
    distributing the learning data to the plurality of terminals only if the plurality of terminals are successfully authenticated.

11. The personal learning method as claimed in claim 1, wherein the distributing the learning data to the authenticated terminal further comprises:
    distributing the learning data to a plurality of terminals at a first time point according to an authentication of the plurality of terminals;

distributing the learning data to another user terminal within the area at a second time point, different from the first time point, according to a later authentication of the other user terminal.

12. A computer readable recording medium having recorded thereon a program executable by a computer for performing the method of claim 1.

13. A personal learning method of a terminal, the personal learning method comprising:
- transmitting, by the terminal, an association request to a device, distinct from the terminal, if the terminal enters into a predetermined service area, established and defined by the device, enabling a personal learning service by the device;
- receiving, by the terminal, an association response for informing a success of a authentication procedure from the device;
- receiving, by the terminal, learning data distributed from the device; and
- transmitting, by the terminal, a learning result based on a uploading request of the learning result related to the learning data to the device.

14. The personal learning method as claimed in claim 13, wherein the receiving of the learning data comprises:
- transmitting a learning data request to the device; and
- receiving the learning data distributed from the device in response to the learning data request.

15. A computer readable recording medium having recorded thereon a program executable by a computer for performing the method of claim 13.

16. The personal learning method as claimed in claim 13, wherein the transmitting of the learning result comprises:
- transmitting the uploading request to the device; and
- transmitting the learning result if the uploading of the learning result is approved.

17. The personal learning method as claimed in claim 13, wherein the transmitting of the learning result comprises:
- monitoring whether a preset length of time lapses from a time point when the learning data was received, whether a learning result submission instruction is transmitted from the device, or whether a preset learning termination time is reached; and
- transmitting the learning result to the device if it is determined that the preset length of time lapses, the learning result submission instruction is received, or the preset learning termination time is reached.

18. The personal learning method of claim 13, further comprising receiving an analysis result corresponding to the transmitted learning result, the analysis result being fed back from the master device.

19. The personal learning method of claim 13, wherein the learning data includes information related to examination questions, and the learning result include information for written answers to the examination questions.

20. The personal learning method of claim 19, wherein the learning data is randomly selected from various types of the learning data.

21. The personal learning method of claim 20, wherein the various types of the learning data are different from each other in terms of fields, or identical to each other in terms of contents but different from each other in terms of arrangements of the contents.

22. The personal learning method of claim 18, wherein the various types of the learning data are different from each other in terms of fields, or identical to each other in terms of contents but different from each other in terms of arrangements of the contents.

23. A device for providing learning data, the device comprising:
- an authentication unit configured to receive an association request from at least one terminal, distinct from the device, entering into a predetermined service area, established and defined by the device, enabling a personal learning service by the device, and to authenticate the at least one terminal;
- a communication unit configured to distribute the learning data to the authenticated terminal, and to receive a learning result based on a uploading request of the learning result related to the learning data.

24. A terminal for receiving learning data, the terminal comprising:
- a communication unit configured to transmit an association request to a device, distinct from the terminal, if the terminal enters into a predetermined service area, determining and defined by the device, enabling a personal learning service by the device, to receive an association response for informing a success of an authentication procedure from the device, and to receive learning data distributed from the device;
- a learning result producing unit configured to transmit a learning result based on a uploading request of the learning result related to the learning data to the device.

* * * * *